(12) United States Patent
Heise

(10) Patent No.: US 8,432,658 B1
(45) Date of Patent: Apr. 30, 2013

(54) ANTISTATIC COATING OF FUEL CELL EXHAUST SYSTEMS MADE OF PLASTIC

(75) Inventor: Axel Heise, Mainz (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/297,881

(22) Filed: Nov. 16, 2011

(51) Int. Cl.
*B60C 19/08* (2006.01)
*H05F 3/00* (2006.01)

(52) U.S. Cl.
USPC .......................................... 361/217; 361/216

(58) Field of Classification Search .................... 361/217
See application file for complete search history.

(56) References Cited

U.S. PATENT DOCUMENTS

| | | | | |
|---|---|---|---|---|
| 5,382,359 A | * | 1/1995 | Brandt | 210/243 |
| 5,630,866 A | * | 5/1997 | Gregg | 96/67 |

* cited by examiner

*Primary Examiner* — Dharti Patel
(74) *Attorney, Agent, or Firm* — John A. Miller; Miller IP Group, PLC

(57) ABSTRACT

An exhaust system for a fuel cell vehicle that is made of plastic. An inner surface of flow pipes that are part of the exhaust system are coated with a conductive material. A conductive through bolt extends through the pipes to be electrically coupled to the conductive coating and chasse ground of the vehicle so that any electro-static charge build-up as a result of the flow of water vapor and exhaust gas through the pipe will be dissipated.

19 Claims, 1 Drawing Sheet

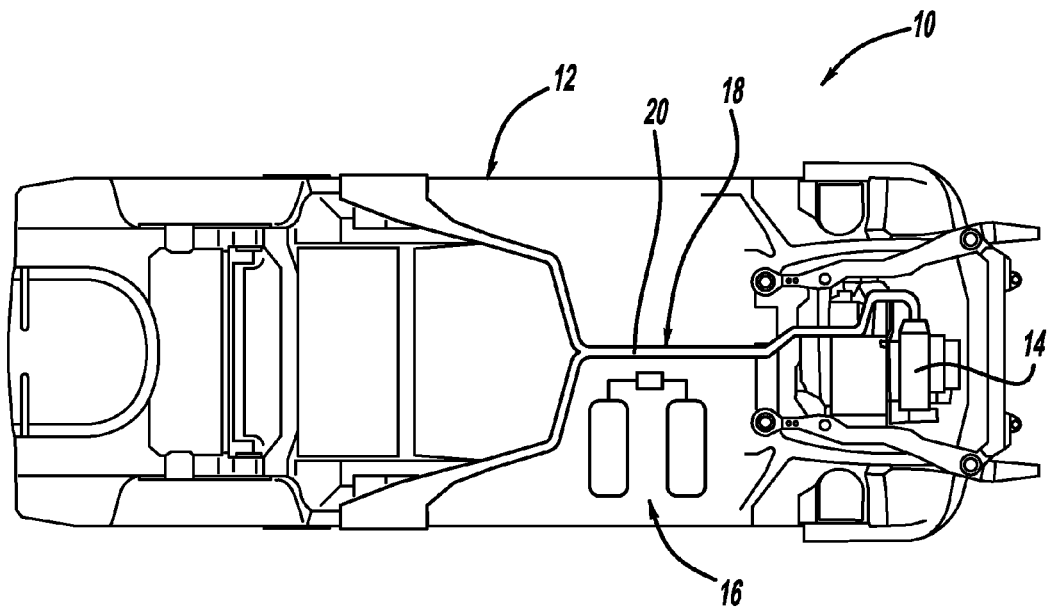
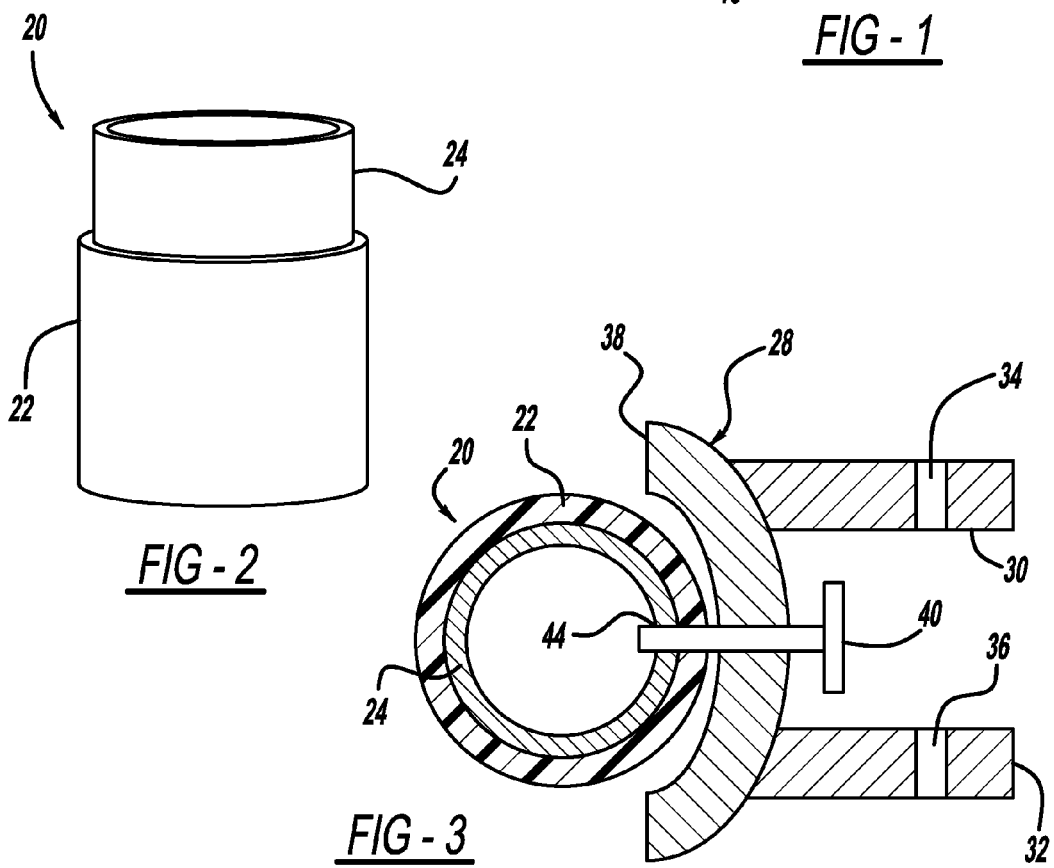

ANTISTATIC COATING OF FUEL CELL EXHAUST SYSTEMS MADE OF PLASTIC

BACKGROUND OF THE INVENTION

1. Field of the Invention

This invention relates generally to a plastic exhaust system for a fuel cell vehicle and, more particularly, to a plastic exhaust system for a fuel cell vehicle, where the exhaust system includes a conductive layer to dissipate electro-static charge.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines. Fuel cell vehicles are expected to rapidly increase in popularity in the near future in the automotive marketplace.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically, but not always, include finely divided catalytic particles, usually a highly active catalyst such as platinum (Pt) that is typically supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack. In one known type of fuel cell system, the hydrogen gas fuel is injected into the anode side of the fuel cell stack by one or more injectors. The injector controls the amount of injected fuel for a particular stack current density based on pulse width modulation (PWM) control signal that controls the opening and closing of the injector.

Typically, hydrogen gas for the fuel cell system is stored in a high pressure storage tank system including one or more interconnected pressure vessels on the vehicle to provide the hydrogen gas necessary for the fuel cell stack. The pressure within the vessels can be 700 bar or more. In one known design, the pressure vessels include an inner plastic liner that provides a gas tight seal for the hydrogen gas, and an outer carbon fiber composite layer that provides the structural integrity of the vessel.

Unlike the exhaust of an internal combustion engine, the exhaust from a fuel cell stack on a vehicle is warm, but not hot, and thus the exhaust system of a fuel cell vehicle does not need to be configured of metal components. Therefore, it has been proposed in the art to configure the exhaust system of a fuel cell vehicle using plastic components to reduce the weight of the vehicle, reduce vehicle cost, etc. Further, because the exhaust from the fuel cell stack is warm, the exhaust pipes can be closely mounted to the underbody of the vehicle chasse without concern for damaging vehicle parts or heating the passenger compartment of the vehicle, as opposed to internal combustion engines which require a space between the exhaust gas line and the vehicle underbody. A representative plastic exhaust system for a fuel cell vehicle is disclosed in U.S. patent application Ser. No. 13/214,777, titled Underbody Integrated Exhaust Path for Fuel Cell Vehicles, filed Aug. 27, 2011, assigned to the assignee of this application, and herein incorporated by reference.

Because the proposed plastic exhaust system for a fuel cell vehicle is to be made of a plastic material, it will have a low electrical conductivity. Thus, the water vapor and other exhaust materials that flow through the exhaust system will cause an electro-static charge build-up on the exhaust system that will not be significantly dissipated because of the non-conductive material. Once enough static charge builds up in the exhaust system, arcing could occur from the area on the exhaust system having the electro-static charge build-up to a conductive part on the chasse of the vehicle representing vehicle ground. Because the fuel cell stack exhaust may include some amount of hydrogen gas, which is highly flammable, this arcing potentially could ignite the hydrogen gas, which has obvious undesirable implications.

SUMMARY OF THE INVENTION

In accordance with the teachings of the present invention, an exhaust system for a fuel cell vehicle is disclosed that is made of plastic. An inner surface of a flow pipe that is part of the exhaust system is coated with a conductive material. A conductive through bolt extends through the pipe to be electrically coupled to the conductive coating and chasse ground of the vehicle so that any electro-static charge build-up as a result of the flow of water vapor and exhaust through the pipe will be dissipated.

Additional features of the present invention will become apparent from the following description and appended claims, taken in conjunction with the accompanying drawings.

BRIEF DESCRIPTION OF THE DRAWINGS

FIG. 1 is a bottom view of a fuel cell vehicle showing a plastic exhaust system;

FIG. 2 is a broken-away perspective view of a portion of a pipe of the plastic exhaust system shown in FIG. 1 and including an inner conductive layer; and FIG. 3 is a cross-sectional view of a portion of the exhaust system showing the inner conductive layer and a through bolt electrically coupled to chasse ground through an exhaust system bracket.

DETAILED DESCRIPTION OF THE EMBODIMENTS

The following discussion of the embodiments of the invention directed to a plastic exhaust system for a fuel cell vehicle is merely exemplary in nature, and is in no way intended to limit the invention or its applications or uses. For example, the present invention has particular application for a fuel cell vehicle. However, as will be appreciated by those skilled in the art, the invention may have application for other vehicles and machines.

FIG. 1 is a bottom view of a fuel cell vehicle 10 showing a vehicle chasse 12. The vehicle 10 includes a fuel cell stack 14 that receives hydrogen gas fuel from a hydrogen gas storage tank system 16. The fuel cell stack 14 generates a fuel cell stack exhaust that includes water vapor, liquid water, air, low levels of waste hydrogen gas and other trace elements. An exhaust gas system 18 including an exhaust flow pipe 20 is coupled to the stack 14 to direct the stack exhaust to the environment in a manner that is well understood by those skilled in the art.

FIG. 2 is a broken-away, perspective view of a section of the pipe 20 that is part of the exhaust system 18. The pipe 20 includes an outer structural layer 22 made of any suitable plastic material, such as a high density polyethylene, that forms the main structure of the pipe 20. The pipe 20 also includes an inner conductive coating 24 made of a suitable conductive material, such as aluminum. Although aluminum is the conductive material used for this embodiment, those skilled in the art will readily appreciate that other conductive materials, including other metals and conductive non-metals, may be applicable for the conductive coating discussed herein. Further, the coating 24 can be deposited on the inner surface of the structural layer 22 by any suitable technique, such as a physical vapor deposition (PVD) process, spraying, etc. Further, the conductive coating 24 is provided on the inside surface of the structural layer 22 in this embodiment. However, in alternate embodiments, it may be desirable to deposit a conductive coating on an outside surface of the layer 22 or both the inside and outside surfaces of the layer 22.

The pipe 20 is intended to represent any, and possibly all, flow channels in the exhaust system 18, and because the structural layer 22 is made of plastic and can be fabricated by any suitable plastic fabrication technique, such as blow molding, injection molding, extrusion, etc., and the coating 24 is a very thin coating deposited by any applicable technique, the pipe 20 can have any cross-sectional shape or design, other than cylindrical, that is desirable for a particular vehicle exhaust system that can be formed by these fabrication techniques. For example, it may be desirable to make the pipe 20 as a rectangular profile.

When water vapor, water droplets, and other materials flow through the pipe 20 from the fuel cell stack 14 through the exhaust system 18 to the environment, the electric-static charge that builds up within and on the pipe 20 will flow as a current in the conductive coating 24 if the coating is electrically coupled to ground. In one non-limiting embodiment, the polymer material of the layer 22 may have a resistance of $1\times10^{11}$ ohms and the aluminum conductive coating 24 may have a resistance of $2.65\times10^{-2}$ ohms.

The electro-static charge that accumulates on the conductive coating 24 needs to be discharged to ground in order to remove the charge and thus the spark potential. FIG. 3 is a cross-sectional view of the pipe 20 coupled to a bracket 28 that holds the pipe 20 to the under-side of the chasse 12. The bracket 28 is a metal bracket in this embodiment, such as a steel bracket, and is intended to represent any bracket suitable for mounting the pipe 20 to the chasse 12. The bracket 28 includes a pair of legs 30 and 32 having through holes 34 and 36, respectively, that accept bolts or screws (not shown) for mounting the bracket 28 to the chasse 12. Further, the bracket 28 includes a semi-spherical support portion 38 that corresponds to the shape of the pipe 20 for holding the pipe 20 to the bracket 28. A through bolt 40 extends through the support portion 38 and an opening 44 in the structural layer 22 and the coating 24 to make electrical contact with the coating 24. Thus, any electrical charge that builds up on the conductive coating 24 creates a current that flows through the through bolt 40 to the bracket 48 and then to the vehicle chasse 12, representing vehicle ground.

It is noted that the bracket 28 is one bracket that may be used to mount the exhaust system 18 to the vehicle 10. The length and complexity of the exhaust system would determine how many of the brackets 28 are need to support the exhaust system 18, where each bracket could include a through bolt for removing static charge build-up as described herein.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An exhaust system for a vehicle, said vehicle including a power source that generates an exhaust, said exhaust system comprising:
    at least one exhaust flow channel through which the exhaust flows from the power source to the environment, said at least one flow channel including an outer structural layer being made of a plastic and a conductive coating formed on an inner surface of the structural layer;
    at least one conductive bracket coupled to the at least one flow channel and being operable to mount the flow channel to a vehicle chasse; and
    at least one conductive member being electrically coupled to the bracket, said conductive member extending through the outer structural layer of the flow channel and making electrical contact with the conductive coating, said conductive member allowing an electrical current from electro-static discharge on the conductive coating to flow to the bracket and to the vehicle chasse, wherein the power source is a fuel cell stack and the at least one exhaust flow channel allows a flow of exhaust from the fuel cell stack.

2. The exhaust system according to claim 1 wherein the conductive coating is an aluminum coating.

3. The exhaust system according to claim 1 wherein the structural layer is made of a high density polyethylene.

4. The exhaust system according to claim 1 wherein the conductive member is a through bolt.

5. The exhaust system according to claim 1 wherein the conductive bracket is a metal bracket.

6. The exhaust system according to claim 1 wherein the at least one flow channel is a cylindrical flow channel.

7. The exhaust system according to claim 1 wherein the at least one flow channel is a pipe.

8. An exhaust system for a vehicle, said vehicle including a fuel cell stack generates an exhaust, said exhaust system comprising:
    at least one exhaust pipe through which the exhaust flows from the fuel cell stack to the environment, said at least one pipe including an outer structural layer being made of a plastic and a conductive coating formed on an inner surface of the structural layer;
    at least one conductive bracket coupled to the at least one flow channel and being operable to mount the flow channel to a vehicle chasse; and
    at least one through bolt being electrically coupled to the bracket, said through bolt extending through the outer structural layer of the flow channel and making electrical contact with the conductive coating, said through bolt allowing an electrical current from electro-static discharge on the conductive coating to flow to the bracket and to the vehicle chasse.

9. The exhaust system according to claim 8 wherein the conductive coating is an aluminum coating.

10. The exhaust system according to claim 8 wherein the structural layer is made of a high density polyethylene.

11. The exhaust system according to claim 8 wherein the conductive bracket is a metal bracket.

12. An exhaust system for a vehicle, said vehicle including a fuel cell stack generates an exhaust, said exhaust system comprising:
    at least one exhaust pipe through which the exhaust flows from the fuel cell stack to the environment, said at least one pipe including an outer structural layer being made of a plastic and a conductive coating formed on the structural layer;
    at least one conductive bracket coupled to the at least one flow channel and being operable to mount the flow channel to a vehicle chasse; and
    at least one conductive member being electrically coupled to the bracket, said through bolt extending through the outer structural layer of the flow channel and making electrical contact with the conductive coating, said through bolt allowing an electrical current from electrostatic discharge on the conductive coating to flow to the bracket and to the vehicle chasse.

13. The exhaust system according to claim 12 wherein the conductive coating is an aluminum coating.

14. The exhaust system according to claim 12 wherein the structural layer is made of a high density polyethylene.

15. The exhaust system according to claim 12 wherein the conductive member is a through bolt.

16. The exhaust system according to claim 12 wherein the conductive bracket is a metal bracket.

17. The exhaust system according to claim 12 wherein the at least one flow channel is a cylindrical flow channel.

18. The exhaust system according to claim 12 wherein the at least one flow channel is a pipe.

19. The exhaust system according to claim 12 wherein the conductive coating is formed on an inner surface of the structural layer.

* * * * *